US010659156B2

(12) United States Patent
Fairweather et al.

(10) Patent No.: US 10,659,156 B2
(45) Date of Patent: May 19, 2020

(54) APPARATUS AND METHOD FOR FACILITATING COMMUNICATION BETWEEN A TELECOMMUNICATIONS NETWORK AND A USER DEVICE WITHIN A BUILDING

(71) Applicant: AIRSPAN NETWORKS INC., Boca Raton, FL (US)

(72) Inventors: Kenneth Fairweather, South Lanarkshire (GB); Martin Lysejko, Surrey (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 0 days.

(21) Appl. No.: 16/227,999

(22) Filed: Dec. 20, 2018

(65) Prior Publication Data

US 2019/0215065 A1 Jul. 11, 2019

(30) Foreign Application Priority Data

Jan. 5, 2018 (GB) .................................. 1800200.6

(51) Int. Cl.
*H04B 10/40* (2013.01)
*H04B 10/114* (2013.01)
(Continued)

(52) U.S. Cl.
CPC .......... *H04B 10/1149* (2013.01); *H02J 50/20* (2016.02); *H02J 50/80* (2016.02);
(Continued)

(58) Field of Classification Search
CPC .................................................. H04B 10/11; H04B 10/2575; H04B 10/2581; H04B 10/40; H04B 10/5161;
(Continued)

(56) References Cited

U.S. PATENT DOCUMENTS 6,963,305 B2   11/2005 Knapp
2002/0131123 A1* 9/2002 Clark ................. H04B 10/1125
                                                              398/118
(Continued)

FOREIGN PATENT DOCUMENTS

GB          2202414 A      9/1988
KR      20090117196 A     11/2009
(Continued)

OTHER PUBLICATIONS

PCT ISR and Written Opinion from Application PCT/GB2018/053472 dated Feb. 26, 2019, 26 pages.
(Continued)

*Primary Examiner* — Tanya T Motsinger
(74) *Attorney, Agent, or Firm* — Haynes Beffel & Wolfeld LLP; Mark A. Haynes; Andrew L. Dunlap

(57) ABSTRACT

An apparatus and method are described for facilitating communication between a telecommunications network and a user device within a building. The apparatus has a first unit for mounting adjacent an external surface of a building, and a second unit for mounting adjacent an internal surface of the building so as to be separated from the first unit via an interface structure of the building, for example a window. The first unit has an antenna system to communicate with the telecommunications network over an external wireless communications link that employs signals in a frequency range that is attenuated by the interface structure to a degree inhibiting reception of the signals by a user device within the building. The apparatus further comprises access circuitry for provision within the building to provide an internal communications link with the user device, and the first unit comprises first transducer circuitry coupled to the antenna system whilst the second unit provides second transducer circuitry coupled to the access circuitry. The first and second transducer circuits are then arranged to cooperate to estab- (Continued)

lish a direct wireless communications link through the interface structure between the first and second transducer circuits, to facilitate communication between the antenna system and the access circuitry. This hence enables a reliable connection to be established between the telecommunications network and a user within the building.

18 Claims, 5 Drawing Sheets

(51) Int. Cl.
| | | |
|---|---|---|
| *H04B 7/155* | (2006.01) | |
| *H04B 10/80* | (2013.01) | |
| *H04B 5/00* | (2006.01) | |
| *H02J 50/20* | (2016.01) | |
| *H02J 50/80* | (2016.01) | |
| *H04W 4/33* | (2018.01) | |
| *H04W 76/14* | (2018.01) | |

(52) U.S. Cl.
CPC ............ *H04B 5/00* (2013.01); *H04B 5/0031* (2013.01); *H04B 5/0037* (2013.01); *H04B 7/15507* (2013.01); *H04B 10/114* (2013.01); *H04B 10/1143* (2013.01); *H04B 10/807* (2013.01); *H04W 4/33* (2018.02); *H04W 76/14* (2018.02)

(58) Field of Classification Search
CPC .................................................. H04B 5/0031; H04B 5/0093; H04B 7/15528; H04B 7/2606; H04W 52/0206
See application file for complete search history.

(56) References Cited

U.S. PATENT DOCUMENTS

| | | | |
|---|---|---|---|
| 2006/0062515 | A1 | 3/2006 | Mahbobi |
| 2008/0267112 | A1* | 10/2008 | Lucidarme ............... H04B 5/02 370/315 |
| 2009/0060530 | A1* | 3/2009 | Biegert ............... H04L 12/2856 398/214 |
| 2016/0268843 | A1* | 9/2016 | Baarman ................ H02J 7/025 |
| 2017/0195054 | A1* | 7/2017 | Ashrafi ................... H04B 10/40 |

FOREIGN PATENT DOCUMENTS

| | | |
|---|---|---|
| KR | 20140004455 A | 1/2014 |
| KR | 101488743 B1 | 2/2015 |

OTHER PUBLICATIONS

UK Search Report from Application GB1800200.6 dated Jun. 18, 2018, 4 pages.

* cited by examiner

APPARATUS AND METHOD FOR FACILITATING COMMUNICATION BETWEEN A TELECOMMUNICATIONS NETWORK AND A USER DEVICE WITHIN A BUILDING

BACKGROUND

The present technique relates to an apparatus and method for facilitating communication between a telecommunications network and a user device within a building.

As more and more users embrace mobile technology, this is placing ever increasing demands on the mobile networks used to support mobile communication. The networks are required to not only support an ever increasing number of devices, but also as the functionality associated with such devices becomes ever more complex, so this has also increased the capacity requirements within the network.

In order to seek to improve network capacity, emerging wireless telecommunications techniques are seeking to use ever higher frequencies for the telecommunications signals. For example, some emerging telecommunications Standards are seeking to use the millimetre (mm) wave frequency range. The use of such high frequency signals can significantly increase capacity, but one technical challenge is the high penetration loss encountered by such high frequency signals, which can significantly affect coverage. For example, direct transmission of millimetre wave services from outdoor infrastructure to indoor devices may be impossible in many situations, due to the significant attenuation caused by the building's structure.

Such problems can be particularly acute in urban environments where there is typically not only a high density of users, but where the urban infrastructure, such as large buildings, can significantly attenuate signals, and hence exacerbate the problem of seeking to provide sufficient network coverage and network capacity to service the users. Users expect not only to obtain good quality connections outdoors, but also whilst indoors.

Accordingly, it would be desirable to provide a mechanism that alleviated the attenuation problem associated with the use of high frequency telecommunications signals.

SUMMARY

In one example configuration, there is provided an apparatus comprising: a first unit for mounting adjacent an external surface of a building; a second unit for mounting adjacent an internal surface of the building so as to be separated from the first unit via an interface structure of the building; the first unit comprising an antenna system to communicate with a telecommunications network over an external wireless communications link that employs signals in a frequency range that is attenuated by the interface structure to a degree inhibiting reception of said signals by a user device within the building; wherein: the apparatus further comprises access circuitry for provision within the building to provide an internal communications link with the user device; the first unit comprises first transducer circuitry coupled to the antenna system and the second unit comprises second transducer circuitry coupled to the access circuitry; and the first transducer circuitry and the second transducer circuitry are arranged to cooperate to establish a direct wireless communications link through the interface structure between the first transducer circuitry and the second transducer circuitry, to facilitate communication between the antenna system and the access circuitry.

In another example configuration, there is provided a method of facilitating communication between a telecommunications network and a user device within a building, comprising: mounting a first unit adjacent an external surface of the building; mounting a second unit adjacent an internal surface of the building so as to be separated from the first unit via an interface structure of the building; providing within the first unit an antenna system to communicate with the telecommunications network over an external wireless communications link that employs signals in a frequency range that is attenuated by the interface structure to a degree inhibiting reception of said signals by a user device within the building; employing access circuitry within the building to provide an internal communications link with the user device; providing the first unit with first transducer circuitry coupled to the antenna system and providing the second unit with second transducer circuitry coupled to the access circuitry; and arranging the first transducer circuitry and the second transducer circuitry to cooperate to establish a direct wireless communications link through the interface structure between the first transducer circuitry and the second transducer circuitry, to facilitate communication between the antenna system and the access circuitry.

In a yet further example configuration, there is provided an apparatus comprising: first means for mounting adjacent an external surface of a building; second means for mounting adjacent an internal surface of the building so as to be separated from the first means via an interface structure of the building; the first means comprising antenna means for communicating with a telecommunications network over an external wireless communications link that employs signals in a frequency range that is attenuated by the interface structure to a degree inhibiting reception of said signals by a user device within the building; wherein: the apparatus further comprises access means for provision within the building and for providing an internal communications link with the user device; the first means comprises first transducer means for coupling to the antenna means and the second means comprising second transducer means for coupling to the access means; and the first transducer means and the second transducer means are arranged for cooperating to establish a direct wireless communications link through the interface structure between the first transducer means and the second transducer means, for facilitating communication between the antenna means and the access means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
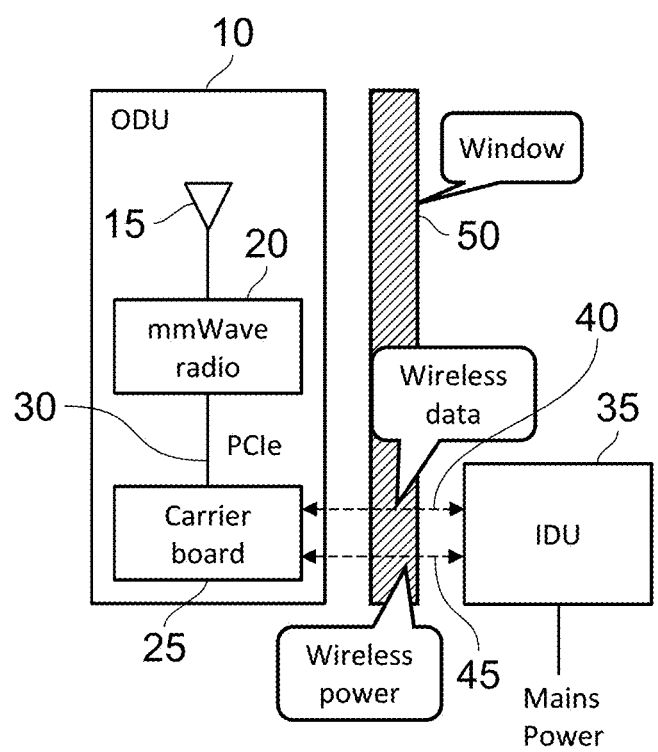
FIG. 1 is a block diagram of an apparatus in accordance with one example arrangement.

In accordance with one example arrangement, an apparatus is provided that comprises a first unit for mounting adjacent and external surface of a building, and a second unit for mounting adjacent and internal surface of the building so as to be separated from the first unit via an interface structure of the building. The first unit incorporates an antenna system used to communicate with the telecommunications network over an external wireless communications link that employs signals in a frequency range that is attenuated by the interface structure of the building to a degree inhibiting reception of such signals by a user device within the building. As mentioned earlier, as telecommunications systems employ higher frequencies in order to seek to increase capacity, the attenuation of such signals becomes particularly problematic, in that the peripheral structures of a building, such as walls, windows, doors, etc., can dramatically attenuate such high frequency signals to an extent that users within the building may not be able to receive those signals. As a particular example of a frequency range that may suffer from such attenuation, the external wireless communications link may employ signals in accordance with the 5G New Radio (5G NR) Standard and the antenna system may operate for example at 24 GHz or 28 GHz (in the microwave frequency range), or at 37 to 42.5 GHz, or 57 to 86 GHz (in the mm wave frequency range). In another example, the antenna system may operate in accordance with the 802.11ad/802.11ay Standards, or the WiGig Standard at 60 GHz (WiGig is a short-range implementation of the 802.11ad Standard). Such high frequency signals suffer very large penetration loss through the external structures of buildings, meaning that signals propagated in the external environment can often not be received by user devices within a building.

In accordance with the techniques described herein, the apparatus may further comprise access circuitry for provision within the building to provide an internal communications link with the user device. The first unit then may comprise first transducer circuitry coupled to the antenna system, whilst the second unit may comprise second transducer circuitry coupled to the access circuitry. The first and second transducer circuits may then be arranged to cooperate with each other to establish a direct wireless communications link through the interface structure between the first transducer circuitry and the second transducer circuitry, to facilitate communication between the antenna system and the access circuitry. As a result, this enables communication between the telecommunications network infrastructure external to the building and a user device within the building via the antenna system provided within the first unit, the direct wireless communications link between the transducer circuits in the first and second units, and the access circuitry provided within the building.

As a result, it is possible to take advantage of the capacity improvements available as a result of using high frequency signals employed by emerging telecommunications Standards, whilst also enabling communication with users inside buildings. In particular, the antenna system within the first unit can remain external to the building, allowing a high quality link to be established with the telecommunications network. Further, through use of the direct wireless communications link between the first transducer circuitry in the first unit and the second transducer in the second unit, signals can be propagated between the outside of the building and the inside of the building without needing to provide any wired connection, and thereafter use of the access circuitry within the building can be used to complete the connection to the user device.

It has been found that such an approach provides a particularly efficient and cost effective mechanism for addressing the attenuation issues associated with the use of high frequency telecommunications signals.

In the examples described herein, the term "link" is intended to identify a conduit of communication between two entities, but is not intended to place any limitations on how that link is established. For example, whilst the link may in some instances comprise a single communication channel, in other embodiments the link may be established using multiple communication channels. Similarly, one or more paths may be used to establish a link.

The direct wireless communications link can take a variety of forms, but in one example arrangement employs a serial communication protocol. By employing serial communication techniques, this can simplify the interface between the first transducer circuitry and the second transducer circuitry. Further, due to the improved signal integrity and transmission speeds in newer serial technologies, it has been found that sufficient transmission speeds can be achievable over such a serial communication link, to meet the bandwidth requirements associated with modern telecommunications systems that use high frequency wireless telecommunications signals. There are a number of known serial communication protocols that could be used for the purpose of the direct wireless communications link. As one example, Peripheral Component Interconnect Express (PCIe) can be used. In another example arrangement, a lightweight data link such as "Thunderbolt" developed by Intel corporation (with collaboration from Apple Inc.) can be used.

The direct wireless communications link can be arranged in a variety of ways, but in one example arrangement provides at least one serial communication channel from the first transducer circuitry to the second transducer circuitry, and at least one serial communication channel from the second transducer circuitry to the first transducer circuitry, to thereby support bidirectional communication. If desired, more than one serial communication channel in each direction can be provided. However, it has been found that in many situations a single serial communication channel in each direction is sufficient to support the bandwidth required.

The techniques employed by the first and second transducer circuits can be varied depending on implementation. However, in one example the first transducer circuitry and the second transducer circuitry are arranged to convert between an electrical form of signal and a wireless form of signal that enables data to be transmitted over the direct wireless communications link at a bit rate supported by the external wireless communications link.

There are various communications techniques that could be used for the wireless form of signal between the two transducer circuits. For example, a magnetic induction communications link or a radio frequency communications link could be established between the two transducer circuits. Due to the fact that the first and second units can be placed in close proximity to each other, for example opposing each other on opposite sides of the interface structure of the building, it has been found that a sufficient enough quality link can be established despite any attenuation introduced by the interface structure, allowing communication at a sufficient bit rate to be achieved to support the bit rates used by the external wireless communications link. When a radio frequency communications link is used, in principle any frequency can be used where the loss over the short distance of the direct wireless communications link is manageable, i.e. does not degrade the signal to an extent where the desired bit rates can no longer be achieved, and where the frequency is high enough to enable modulation to support the desired data throughput.

By using a magnetic induction communications link or a radio frequency communications link, such techniques can be used for the direct wireless communications link irrespective of whether the interface structure separating the first and second units is a wall, or is another structure such as a window or a door.

However, in one example arrangement the apparatus may be positioned adjacent an interface structure of the building that is optically permeable, such as a window or a glazed door, and the direct communications link may be formed as a free-space optical communications link. It has been found that such an approach can provide a particularly efficient and cost effective mechanism for implementing the direct wireless communications link to allow high bit rate communication to take place between the first unit and the second unit via serial communication techniques.

In one example arrangement, the first transducer circuitry and the second transducer circuitry comprise laser optics and the first and second units are aligned with respect to each other to allow laser communication to be established between the first transducer circuitry and the second transducer circuitry. It has been found that by using serial communication techniques, alignment of the laser optics can be readily achieved.

By using the first and second transducer circuits to establish a direct wireless communications link, there is no need to take steps that would otherwise be necessary to provide a direct wired connection between the first unit and the second unit, hence avoiding the need to drill holes through the interface structure of the building for example. Further, this can assist with regards to the weatherproofing of the first unit, which is arranged to be mounted on the external surface of the building, and hence needs to be resilient to moisture ingress.

However, it is still necessary to provide some power supply to the first unit. Whilst in some deployments there may be a readily available external power source that can be used for this purpose, in one example arrangement the first unit comprises a wireless power receiver arranged to receive a wireless power supply from a power source inside the building. In particular, it has been found that the power requirements of the first unit can be kept relatively small, and that sufficient power for the first unit can be provided via a wireless power supply. Accordingly, this further reduces complexity by avoiding the need to route a wired power supply to the first unit on the outside of the building. This can significantly increase the ease of deployment, by providing enhanced flexibility as to where the first unit is placed, and also avoiding the need to drill any holes between the inside of the building and the outside of the building to provide power to the first unit. In addition, this further enhances the durability of the first unit, since a sealed unit can be provided that does not require any wires to pass from the inside to the outside of the unit to support either the power supply or the communications link with the second unit.

Whilst the power source within the building that is used to generate the wireless power supply for the first unit can take a variety of forms, in one example arrangement the second unit comprises a wireless power transmitter to act as the power source.

In one example arrangement, the direct wireless communication link between the first and second transducer circuits is established entirely separately to the wireless power link. However in another example arrangement, the first and second transducer circuits may be arranged to form the direct wireless communications link by modulating data onto a wireless power link provided by the wireless power transmitter and the wireless power receiver. For example, the data communication over the direct wireless communications link could be transmitted by modulating higher frequency signals onto the wireless power link than the frequency of the signals used to transmit the power supply, with filters then being used to extract the data at the receiver end.

There are a number of technologies that can be used to establish the wireless power supply. For example, inductive coupling or capacitive coupling techniques can be used, which can provide reliable cost effective techniques given the relatively short distance between the first unit and the second unit. However, if desired other techniques can be used such as microwave transmission, and indeed in some instances lightwave technology could also be used.

A control processor may be provided by the apparatus to control operation of the first transducer circuitry and the second transducer circuitry. In one example arrangement, the control processor can be provisioned within the building. In particular, due to the relatively simplistic nature of the serial communications link established between the first and second transducer circuits, it has been found that there is often no requirement for a control processor block to be provided within the first unit, hence reducing the power consumption requirements of the first unit.

When the control processor is provided within the building, it may in one example arrangement be provided as part of the second unit. Alternatively it could be provided externally to the second unit and coupled with the second unit via a dedicated connection. The dedicated connection could be a wired or a wireless connection depending on implementation. In some instances, the mains power supply could be associated with the unit containing the control processor, and the second unit could if desired be powered using the above-mentioned dedicated connection between the control processor and the second unit.

There are a number of ways in which the second transducer circuitry can be coupled to the access circuitry. However, in one example arrangement the access circuitry is arranged to be connected to the control processor to enable the control processor to control communication between the second transducer circuitry and the access circuitry. Hence, the control processor can coordinate the communications between the direct wireless communications link established through use of the two transducer circuits, and the access circuitry used to establish communications with the appropriate end user device.

The access circuitry may be provided as a separate unit, may be provided within a unit containing the control processor, or may be provided directly within the second unit that also contains the second transducer circuitry.

In one example arrangement, the interface structure is a window of the building. It will be appreciated that the techniques described herein can be used in association with a window that is fixed, or in association with a window that is openable, provided the first and second units are mounted on opposite sides of the window facing each other, so as to allow the first and second transducer circuits to establish the direct wireless communications link through the window. Similarly, the window could be a glazed partition that is used to enable people to enter and exit the building, for example a door, provided the alignment between the first and second units is maintained in use.

As mentioned earlier, the external wireless communications link could employ signals in a variety of different frequency ranges, but in one example employs signals in a mm wave frequency range.

In one example arrangement, the frequency range of the signals communicated via the external wireless communications link supports data transmission rates of the order of 1 gigabit per second or higher. Emerging telecommunications Standards allow gigabit per second transmission speeds to be achieved, but often employ signals at frequencies that suffer very significant attenuation at the periphery of buildings.

The access circuitry used to provide the internal communications link with the user device can take a variety of forms, and in one embodiment is arranged to provide at least one of a wired Internet connection, a wireless Internet connection, or a wireless telecommunications connection.

Hence, the user may establish either a wired or a wireless Internet connection in order to couple the device to the external telecommunications network. However, alternatively or in addition, the access circuitry could itself transmit a wireless telecommunications signal, at any suitable desired frequency, hence potentially making the use of the above described apparatus entirely transparent to the end user.

Particular examples will now be described with reference to the Figures.

FIG. 1 is a block diagram schematically illustrating an apparatus in accordance with one example arrangement. The apparatus comprises an outdoor unit (ODU) 10 (also referred to herein as a first unit) for mounting adjacent an external surface of a building, and an indoor unit (IDU) 35 (also referred to herein as a second unit) for mounting in proximity to the ODU 10, but adjacent an internal surface of the building, so that the ODU 10 and the IDU 35 are separated from each other via the interface structure 50 of the building. The interface structure can take a variety of forms, for example an external wall or a window, and in the example illustrated in FIG. 1 it is assumed that the interface structure is a window. Both the ODU 10 and the IDU 35 can be mounted directly on the surface of the window 50, for example by using suitable fastening techniques such as adhesive, or alternatively may be mounted at the end of an adjacent wall, so that the ODU 10 and IDU 35 face each other through the window 50.

The ODU 10 has wireless telecommunications circuitry 20 for communicating with a telecommunications network via an antenna array 15. In the examples illustrated herein, the telecommunications network operates using signals in a frequency range that is attenuated by the interface structure 50 to a significant degree such that reception of those telecommunications signals by user devices within the building is inhibited. In particular, high frequency signals may be used, such as those specified by emerging telecommunications Standards, that can support transmission speeds of gigabits per second. For example, the telecommunications network may use a mm wave or microwave frequency specified by the 5G NR Standard, or the 60 GHz frequency specified by the WiGig Standard. In the example illustrated in FIG. 1, it will be assumed that the telecommunications circuitry 20 employs mm wave radio.

A carrier board 25 is provided in which the non-radio components of the ODU 10 can be provided. As will be seen from FIG. 1, the ODU 10 hence terminates the mm wave link in a mm wave radio circuit 20 hosted by the carrier board 25. As will be discussed later, the carrier board 25 will include transducer circuitry for converting electrical signals into a suitable wireless form for transmission over a wireless data link 40 between the ODU 10 and the IDU 35. To simplify the communications over the wireless data link 40, the communication between the carrier board 25 and the radio circuitry 20 is serialised in accordance with a suitable serial communications protocol. There are a number of known serial communications protocols that provide signalling integrity and transmission speeds sufficient to handle the bit rates associated with the telecommunications signals transmitted and received via the antenna array 15. In one example arrangement, the Peripheral Component Interconnect Express (PCIe) protocol can be used, hence enabling a PCIe cable 30 to be used to connect the radio circuit components 20 to the carrier board 25. As an alternative, a "Thunderbolt" interface can be established between the radio circuitry 20 and the carrier board 25, this being a hardware interface developed by Intel corporation (with collaboration from Apple Inc.), and which combines PCIe and DisplayPort (DP) into two serial signals.

Through the use of the direct wireless communications link 40 between the ODU 10 and the IDU 35, the high frequency wireless communications link used by the telecommunications network can be terminated at the ODU 10, and then a high bit rate link can be established over path 40 between the ODU 10 and the IDU 35, whereafter a connection can be made from the IDU 35 to an item of user equipment within the building. As will be discussed later, there are a number of technologies that can be used in association with the wireless data link 40, through the use of suitable transducer circuits on the carrier board 25 of the ODU 10 and within the IDU 35.

Whilst in one arrangement the ODU 10 may be arranged to receive its power supply directly, in another example arrangement illustrated in FIG. 1 wireless power can be provided to the ODU 10 via a link 45 with the IDU 35, with the IDU 35 then being connected to a mains power supply. By such an approach, it will be appreciated that there is no need for access holes into the ODU 10 to be provided either for the communications link with the IDU, or to receive power, and this can significantly simplify the construction of the ODU 10 whilst providing good weatherproofing, by removing possible sources of moisture ingress. Further, by using both a wireless data link 40 and a wireless power link 45, no holes need to be drilled through the external surface of the building to connect the ODU 10 with the IDU 35 or a power supply, thereby significantly reducing the complexity of deployment of the apparatus.

Figure 2A:
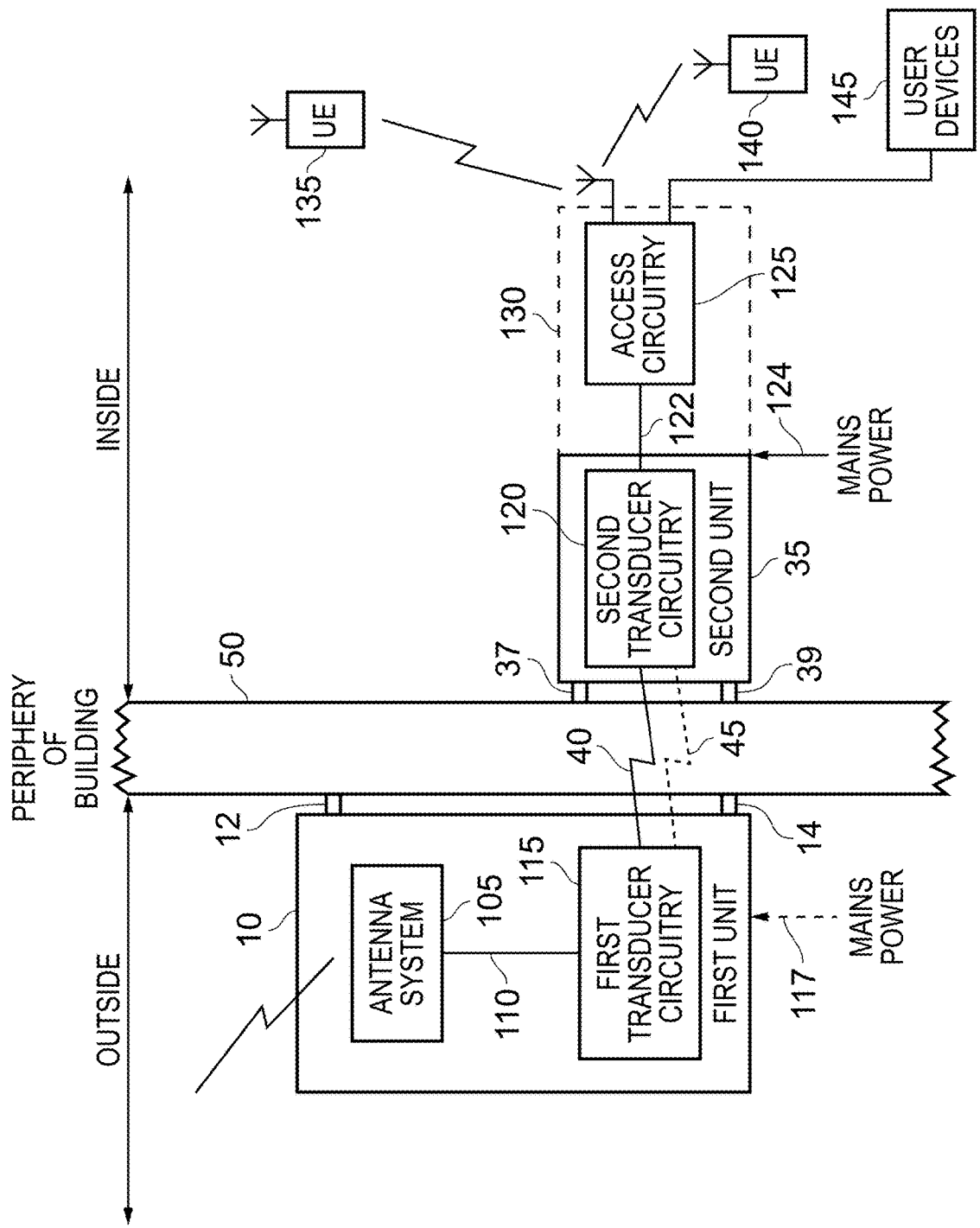
FIG. 2A illustrates components provided within an apparatus in accordance with one example arrangement, to provide a communication route between items of user equipment inside a building and a telecommunications network external to the building.

FIG. 2A illustrates the components provided within the ODU and the IDU to establish a communication route between items of user equipment 135, 140, 145 located inside a building, and a telecommunications network propagating high frequency signals externally to the building. The ODU 10 (referred to in FIG. 2A as the first unit) is mounted via a suitable mounting mechanism 12, 14 to the periphery 50 of the building, so as to be placed on the outside of the building in order to allow communication with the telecommunications network. On an opposing inside surface of the building, the IDU 35 (referred to in FIG. 2A as the second unit) is also mounted to the periphery of the building 50 via a suitable mounting mechanism 37, 39. When the portion 50 of the building separating the first unit 10 and the second unit 35 is for instance a wall, the first unit and the second unit may for example be mounted using conventional screws and wall plugs. However, when the interface structure 50 is a window, whilst it would still be possible to use such fastenings into an adjacent piece of brickwork, provided the first and second units could still be positioned so that they face each other through the window, in an alternative arrangement the first and second units may be attached for example via adhesive fasteners to opposite sides of the window.

The antenna system 105 includes not only an array of antenna elements used to transmit and receive the RF signals (such as the antenna array 15 shown in FIG. 1), but also the associated RF stage circuit elements that process the transmitted and received RF signals. In addition, the antenna system will have associated baseband stage (i.e. digital signal processing stage) circuits for processing the transmit signals prior to them being converted into RF signals, and for processing received signals after they have been converted from RF signals into baseband signals.

As discussed earlier with reference to FIG. 1, a serial communication path 110 can then be provided between the antenna system 105 and other signal processing components within the first unit 10.

A first transducer circuit 115 can be provided within the first unit, that is arranged to interact with a corresponding second transducer circuit 120 within the second unit 35, in order to establish a direct wireless communications link 40 through the interface structure 50 of the building between the two transducer circuits 115, 120. There are a number of technologies that can be used to establish the short range direct wireless communications link 40 required between the first and second transducer circuit 115, 120, whilst supporting the gigabit per second transmission rates that are supported by the telecommunications network when using high frequency signals such as mm wave radio signals. For example, a magnetic induction communications link 40 could be established between the first and second transducer circuits, or indeed a radio frequency communications link could be established. Due to the short range of the link 40, radio signals at a variety of different frequencies may be able to be used in order to propagate a high enough bandwidth signal between the two transducer circuits whilst compensating for any attenuation.

When using techniques such as magnetic induction or radio frequency communication, it will be appreciated that the intervening structure 50 of the building could take a variety of forms, provided the structure is sufficiently permeable to magnetic signals or RF signals to allow the short range communication between the two transducer circuits. However in one particular example arrangement, the intervening structure 50 is optically permeable, and the direct wireless communications link 40 is established as a free-space optical communications link. For example, suitable laser optics can be used to provide bidirectional serial communications links between the first and second transducer circuits, supporting gigabit per second transmission rates, and this can provide a very cost effective and reliable mechanism for achieving high bit rate communication through the periphery of the building. All that is required is to align the transducer circuits 115, 120 so as to allow the laser signals to be propagated between the two transducer circuits in either direction.

As shown in FIG. 2A, access circuitry 125 is also provided inside the building to establish one or more communications links with items of user equipment. Any suitable communication mechanism can be used, and hence for example the access circuity may provide one or more of a wired Internet connection, a wireless Internet connection, or a wireless telecommunications connection. Indeed, in one example, the access circuitry may include radio circuits that can transmit and receive signals using the same or similar frequencies to the frequencies employed in the external environment by the telecommunications network.

As shown by the dotted box 130, the access circuitry 125 may be provided within the second unit 35 or alternatively may be provided in a separate housing. In either event, the access circuitry 125 is coupled to the second transducer circuitry 120 via an appropriate connection path 122 in order to enable communication of electrical signals between the second transducer circuitry 120 and the access circuitry 125 in either direction. As will be discussed in more detail with reference to the examples of FIGS. 3 and 4, there may not be a direct connection between the second transducer circuitry and the access circuitry, and instead the communications may be routed via an intervening network processing unit (NPU) used to control the operations of the two transducer circuits 115, 120 and communication between the second transducer circuit and the access circuitry 125.

As shown in FIG. 2A, mains power may be provided over a path 124 to at least one of the internal units. For example, it may be provided to the second unit 35, or in the event that there are separate indoor units the power may be provided to the indoor unit containing the access circuitry 125 and any associated NPU, and power may then be propagated from that unit to the second unit 35.

As shown by the dotted line 117, in principle the ODU 10 may receive its own direct mains power supply. For example, in some deployments, there may be ready access to a mains power supply on the outside of the building. However, in one arrangement, as indicated by the dotted line 45, wireless power delivery is used to power the ODU, by including a suitable wireless power transmitter within the second unit 35, and an associated power receiver within the ODU 10. There are a number of wireless power technologies that can be used for this purpose. Due to the close proximity of the ODU 10 and the IDU 35, near field techniques such as inductive coupling or capacitive coupling could be used to transmit wireless power to the ODU 10 from the IDU 35. Alternatively, other techniques could be used such as microwave transmission. In one example arrangement, it has been found that the number of components provided within the ODU 10, and/or their power consumption requirements, can be kept to a minimum, and accordingly a sufficient power supply can be provided via wireless techniques. For instance, in one example arrangement there is no need to provide a separate network processing unit in the ODU 10, and the components required for the antenna system 105, and to support the function of the first transducer circuitry 115, can collectively draw less than 5 Watts.

Figure 2B:
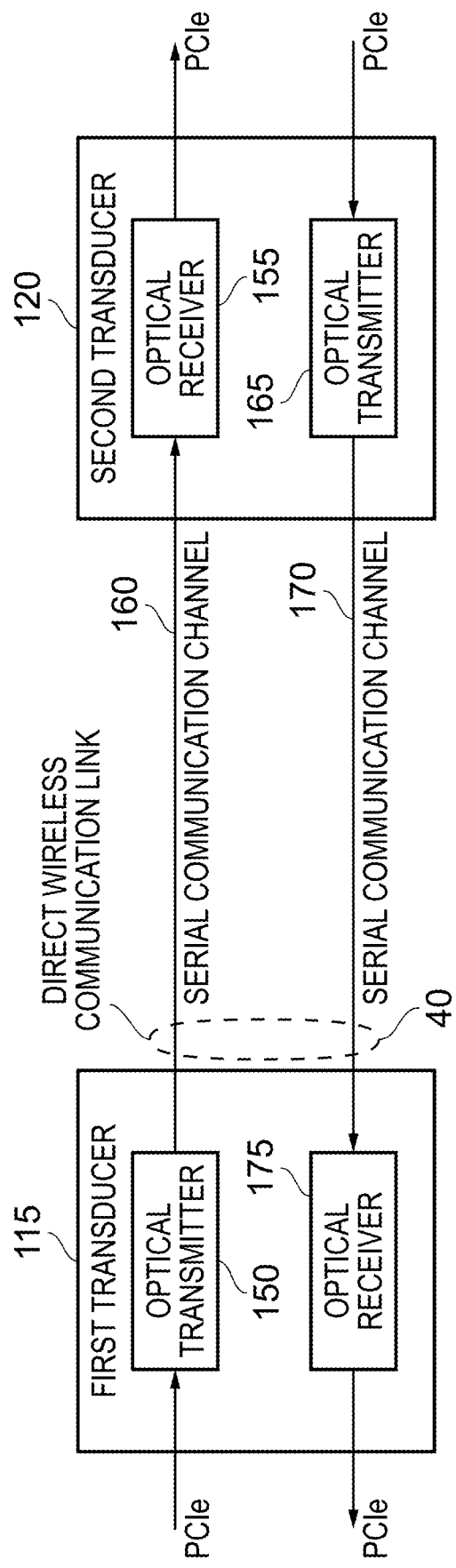
FIG. 2B schematically illustrates serial communication channels that may be provided using the first and second transducer circuits of FIG. 2A in accordance with one example arrangement.

FIG. 2B schematically illustrates how a free-space optical communications link can be established between the two transducer circuits 115, 120. In particular, an optical transmitter 150 is provided within the first transducer circuitry 115, which in one example is arranged to produce a laser signal for transmitting via the serial communication channel 160 to a suitable optical receiver 155 within the second transducer circuitry 120. For example, an infra-red laser diode may be used to implement the optical transmitter, with suitable photo-diode components then being provided to form the optical receiver 155. By such an approach, incoming serial communication signals, for example using the PCIe communications protocol, can be converted into optical signals for transmitting over the path 160 to the optical receiver, whereby they can be converted back into electrical signals conforming to the PCIe protocol.

As also shown in FIG. 2B, to support bidirectional communication, a further optical transmitter 165 can be provided within the second transducer circuitry 120 for transmitting an optical signal over the serial communications channel 170 to a suitable optical receiver 175. Again, a combination of infra-red laser diode and photo diode components can be used for this purpose.

It has been found that, by the use of such optical laser components, a suitable high bit rate direct communication path can be provided through a window 50 using components that are relatively inexpensive and consume relatively low power.

Figure 3:
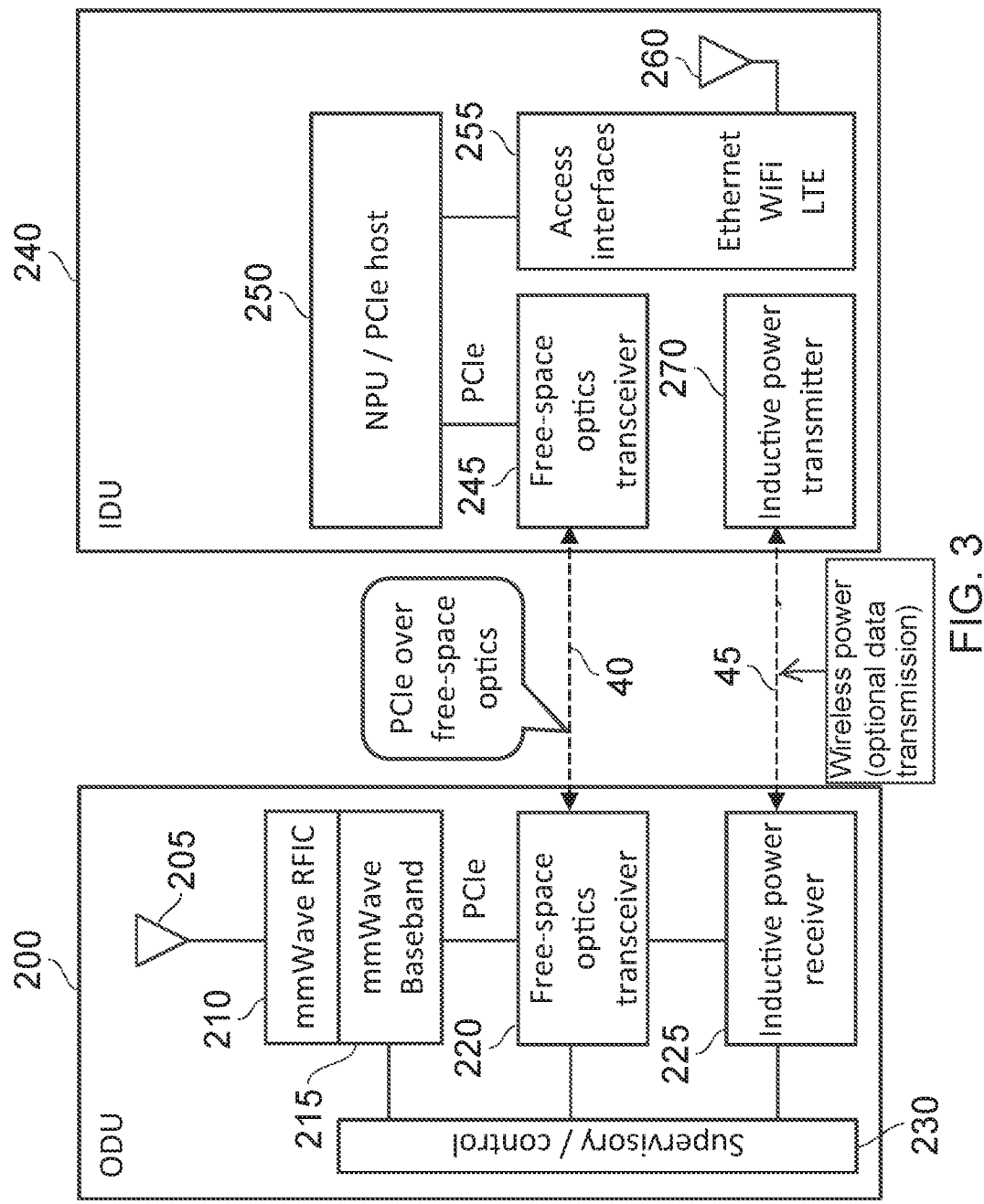
FIG. 3 is a block diagram illustrating in more detail components provided within the outdoor unit and the indoor unit in accordance with one example arrangement.

FIG. 3 is a block diagram illustrating in more detail components provided within the ODU and IDU in accordance with one example configuration. As shown in FIG. 3, the ODU 200 comprises an antenna array 205, an integrated circuit 210 for performing RF stage processing of transmitted and received signals (in this example signals in the mm wave RF frequency range), and baseband stage components 215 for performing baseband processing of the transmitted and received signals. A PCIe connection is then provided to the free-space optics transceiver 220 that operates as the first transducer circuit discussed earlier. Power for the components within the ODU 200 is provided via a suitable power receiver 225 that is arranged to receive wireless power over a link 45 from an associated power transmitter 270 within the IDU 240. As mentioned earlier, a number of wireless power techniques could be used, but in the example illustrated in FIG. 3 inductive coupling is used. More specifically, an inductive coupling technique is employed that conforms to the Qi Standard, version 1.2 or later.

A supervisory/control block 230 is provided for controlling and coordinating the activities of the radio circuitry 210, 215, the transceiver 220 and the power circuitry 225, for example by setting up the wireless power receiver 225, and controlling provision of the resultant power supply and data channels to the other components in the ODU 200.

As discussed earlier with reference to FIG. 2B, bidirectional serial communication channels can be established between the free-space optics transceiver 220 within the ODU 200 and the corresponding free-space optics transceiver 245 provided within the IDU 240 in order to implement the direct wireless communication link 40. The optics transceiver 245 within the IDU 240 is then connected via a PCIe connection to a network processing unit (NPU) which also operates as a PCIe host. The NPU 250 hence acts as a source and sink for the data being communicated over the free-space optical communication path, and also serves to communicate with the access circuitry 255 and associated antenna array 260, to control the routing of traffic between particular end users within the building, and the telecommunications network external to the building. As mentioned earlier with reference to FIG. 2A, a number of different access interfaces could be provided, for example Ethernet to provide a wired internet connection to a user device 145, a WiFi connection to establish a wireless internet connection with an item of user equipment 140, or a telecoms connection such as an LTE connection to establish a telecommunications link with an item of user equipment 135.

By using suitable known serialisation protocols to serialise the communications between the ODU 200 and the IDU 240, this can relieve the ODU of the need to incorporate a potentially power hungry network processing unit, and the required network processing functionality can be provided within the IDU 240. This reduces the power consumption requirements of the ODU, enabling the ODU to be wirelessly powered using inductive power transfer. The NPU 250 then provides downstream indoor connectivity via wired or wireless interfaces, through its communication between the optics transceiver 245 and the access interfaces 255.

Figure 4:
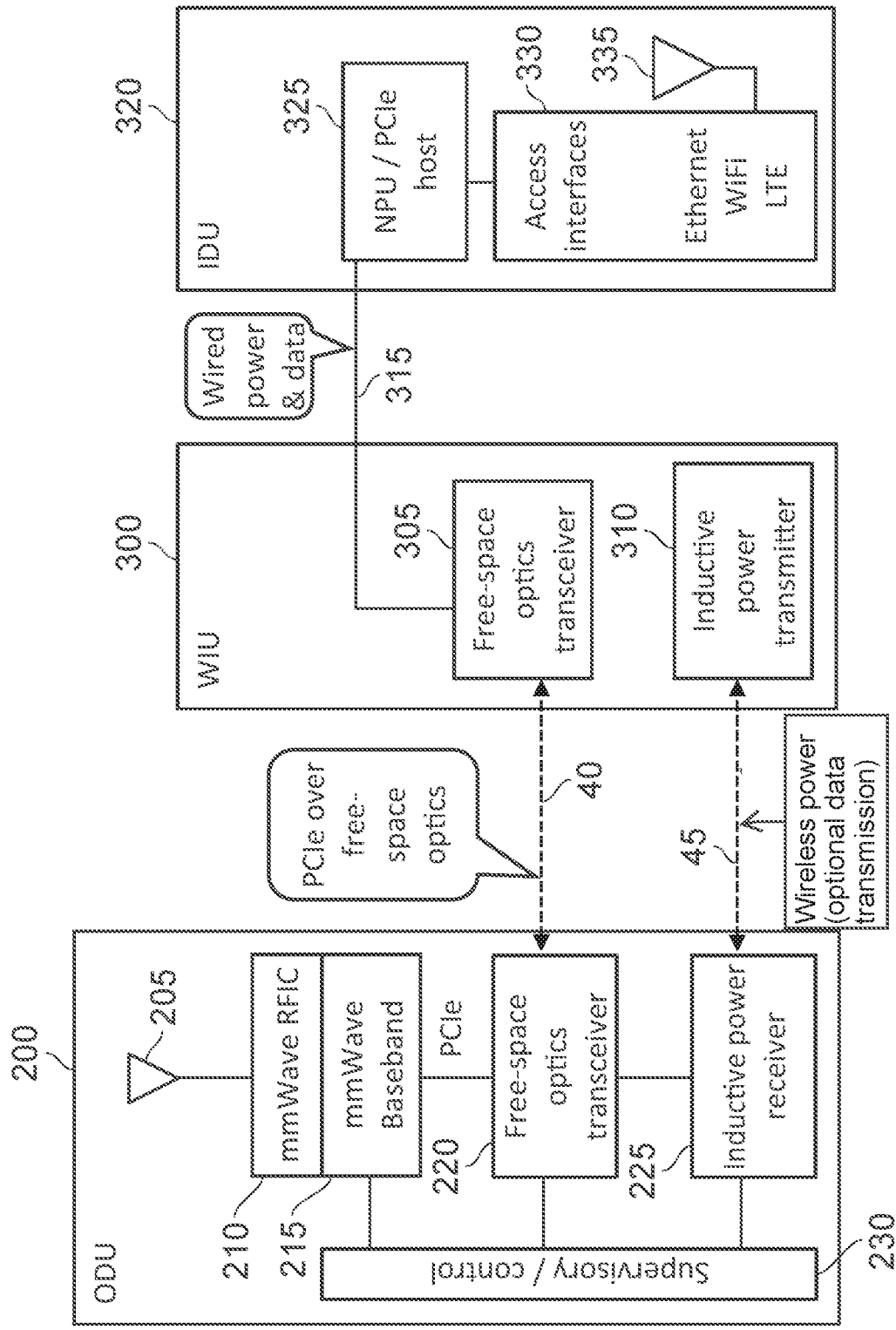
FIG. 4 is a block diagram illustrating in more detail components provided within the outdoor unit and the indoor unit in accordance with an alternative approach where the indoor unit is formed from two physically discrete units.

FIG. 4 illustrates an alternative arrangement where the functionality of the indoor unit is split into two discrete units. In particular, a relatively small window interface unit (WIU) 300 can be provided for mounting adjacent the window 50 on the inside of the building, with that component including the free-space optics transceiver 305 and inductive power transmitter 310 (equivalent to the components 245, 270, discussed earlier with reference to FIG. 3). Such an approach hence places minimal functionality adjacent to the window so that the remaining part of the IDU can be placed in a more convenient location. In particular, the main IDU 320 will retain the NPU 325 and access interfaces 330, with any associated antenna array 335 (these corresponding to the components 250, 255 and 260 discussed earlier with reference to FIG. 3), and a dedicated connection can then be provided over path 315 between the IDU 320 and the WIU 300. Again, a suitable serial connector can be used, such as a PCIe connector or a Thunderbolt connector. By using a Thunderbolt connection, it is also possible to transmit power over the direct communication link 315 in an efficient manner, hence enabling the WIU 300 to avoid the requirement for a separate power supply and instead to take its power directly from the IDU 320 (which can then be connected to a mains supply).

Whilst in FIGS. 3 and 4, separate wireless links 40, 45 are shown for the data communication and the wireless power transmission, in an alternative arrangement it may be possible to modulate the data transmission onto the wireless power transmission, hence providing a single wireless link. For example, if an inductive power supply was operating at approximately 5 MHz, higher frequency signals could be modulated onto the power supply signal to represent the serial data communication traffic, and then filters could be used to extract the high frequency signal at the receiving end.

From the above described examples, it will be seen that an apparatus of the form described enables the capacity benefits associated with high frequency radio signals to be achieved even in environments where those signals are subjected to significant attenuation, such as in urban environments where a large number of users may be indoors, and where the peripheral structures of buildings significantly attenuate the high frequency radio signals. In particular, by using an apparatus of the form described herein, the high frequency radio communication can be terminated at the outside of the building before it is subjected to significant attenuation, and then a direct wireless communication link can be established through the periphery of the building using corresponding transducer circuits within an outdoor unit and an indoor unit, to enable high bit rate communications to take place between the inside and the outside of the building. Through use of appropriate access circuitry, a route can thereby be established between users inside the building and the telecommunications infrastructure in the external environment.

Further, by use of suitable wireless techniques, such an apparatus can be readily deployed, and can be manufactured in a cost effective manner to support high bit rates, whilst being easy to deploy in urban environments and whilst providing an outdoor unit that is highly weather resistant, by avoiding the need for wired connections to the outdoor unit.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus comprising:
    a first unit for mounting adjacent an external surface of a building;
    a second unit for mounting adjacent an internal surface of the building so as to be separated from the first unit via an interface structure of the building;
    the first unit comprising an antenna system to communicate with a telecommunications network over an external wireless communications link that employs signals in a frequency range that is attenuated by the interface structure to a degree inhibiting reception of said signals by a user device within the building;
    wherein:
        the apparatus further comprises access circuitry for provision within the building to provide an internal communications link with the user device;
        the first unit comprises first transducer circuitry coupled to the antenna system and the second unit comprises second transducer circuitry coupled to the access circuitry;
        the first transducer circuitry and the second transducer circuitry are arranged to cooperate to establish a direct wireless communications link through the interface structure and between the first transducer circuitry and the second transducer circuitry, to facilitate data communication between the antenna system and the access circuitry;
        the first unit comprises a wireless power receiver arranged to receive a wireless power supply from a power source inside the building, and the second unit comprises a wireless power transmitter to act as the power source, the wireless power supply being received and transmitted via a wireless power link established between the wireless power receiver and the wireless power transmitter;
        the second transducer circuitry and the wireless power transmitter are arranged to form a communication channel having data from the direct wireless communications link modulated onto the wireless power link established between the wireless power transmitter and the wireless power receiver; and
        the wireless power supply is arranged to be transmitted from the power source to the wireless power receiver using microwave transmission.

2. An apparatus as claimed in claim 1, wherein the direct wireless communications link employs a serial communication protocol.

3. An apparatus as claimed in claim 2, wherein the direct wireless communications link provides at least one serial communication channel from the first transducer circuitry to the second transducer circuitry, and at least one serial communication channel from the second transducer circuitry to the first transducer circuitry, to thereby support bidirectional communication.

4. An apparatus as claimed in claim 1, wherein the first transducer circuitry and the second transducer circuitry are arranged to convert between an electrical form of signal and a wireless form of signal that enables data to be transmitted over the direct wireless communications link at a bit rate supported by the external wireless communications link.

5. An apparatus as claimed in claim 4, wherein the interface structure of the building is optically permeable, and the direct wireless communications link is a free-space optical communications link.

6. An apparatus as claimed in claim 5, wherein the first transducer circuitry and the second transducer circuitry comprise laser optics and the first and second units are aligned with respect to each other to allow laser communication to be established between the first transducer circuitry and the second transducer circuitry.

7. An apparatus as claimed in claim 4, wherein the direct wireless communications link is one of:
    a magnetic induction communications link; and
    a radio frequency communications link.

8. An apparatus as claimed in claim 1, further comprising:
    a control processor for provision within the building, and arranged to control operation of the first transducer circuitry and the second transducer circuitry.

9. An apparatus as claimed in claim 8, wherein the control processor is provided within the second unit.

10. An apparatus as claimed in claim 8, wherein the control processor is provided externally to the second unit, and coupled with the second unit via a dedicated connection.

11. An apparatus as claimed in claim 8, wherein the access circuitry is arranged to be connected to the control processor to enable the control processor to control communication between the second transducer circuitry and the access circuitry.

12. An apparatus as claimed in claim 1, wherein the access circuitry is provided within the second unit.

13. An apparatus as claimed in claim 1, wherein the interface structure is a window of the building.

14. An apparatus as claimed in claim 1, wherein the external wireless communications link employs signals in a mm wave frequency range.

15. An apparatus as claimed in claim 1, wherein the frequency range of the signals communicated via the external wireless communications link supports data transmission rates of at least 1 gigabit per second.

16. An apparatus as claimed in claim 1, wherein the access circuitry is arranged to provide as the internal communications link at least one of:
    a wired Internet connection;
    a wireless Internet connection; and
    a wireless telecommunications connection.

17. A method of facilitating communication between a telecommunications network and a user device within a building, comprising:
    mounting a first unit adjacent an external surface of the building;
    mounting a second unit adjacent an internal surface of the building so as to be separated from the first unit via an interface structure of the building;

providing within the first unit an antenna system to communicate with the telecommunications network over an external wireless communications link that employs signals in a frequency range that is attenuated by the interface structure to a degree inhibiting reception of said signals by a user device within the building;

employing access circuitry within the building to provide an internal communications link with the user device;

providing the first unit with first transducer circuitry coupled to the antenna system and providing the second unit with second transducer circuitry coupled to the access circuitry;

arranging the first transducer circuitry and the second transducer circuitry to cooperate to establish a direct wireless communications link through the interface structure between the first transducer circuitry and the second transducer circuitry, to facilitate data communication between the antenna system and the access circuitry;

providing the first unit with a wireless power receiver to receive a wireless power supply from a power source inside the building, and providing the second unit with a wireless power transmitter to act as the power source, the wireless power supply being received and transmitted via a wireless power link established between the wireless power receiver and the wireless power transmitter; and employing the second transducer circuitry and the wireless power transmitter to form a communication channel having data from the direct wireless communications link modulated onto the wireless power link established between the wireless power transmitter and the wireless power receiver, wherein the wireless power supply is transmitted from the power source to the wireless power receiver using microwave transmission.

18. An apparatus comprising:

first means for mounting adjacent an external surface of a building;

second means for mounting adjacent an internal surface of the building so as to be separated from the first means via an interface structure of the building;

the first means comprising antenna means for communicating with a telecommunications network over an external wireless communications link that employs signals in a frequency range that is attenuated by the interface structure to a degree inhibiting reception of said signals by a user device within the building;

wherein:

the apparatus further comprises access means for provision within the building and for providing an internal communications link with the user device;

the first means comprises first transducer means for coupling to the antenna means and the second means comprising second transducer means for coupling to the access means;

the first transducer means and the second transducer means are arranged for cooperating to establish a direct wireless communications link through the interface structure between the first transducer means and the second transducer means, for facilitating data communication between the antenna means and the access means;

the first means comprises a wireless power receiver means for receiving a wireless power supply from a power source inside the building, and the second means comprises a wireless power transmitter means for acting as the power source, the wireless power supply being received and transmitted via a wireless power link established between the wireless power receiver means and the wireless power transmitter means;

the second transducer means and the wireless power transmitter means are arranged for forming a communication channel having data from the direct wireless communications link modulated onto the wireless power link between the wireless power transmitter means and the wireless power receiver means; and the wireless power supply is arranged to be transmitted from the power source to the wireless power receiver means using microwave transmission.

* * * * *